E. W. CRELLIN.
METAL BENDING MACHINE.
APPLICATION FILED NOV. 2, 1914.

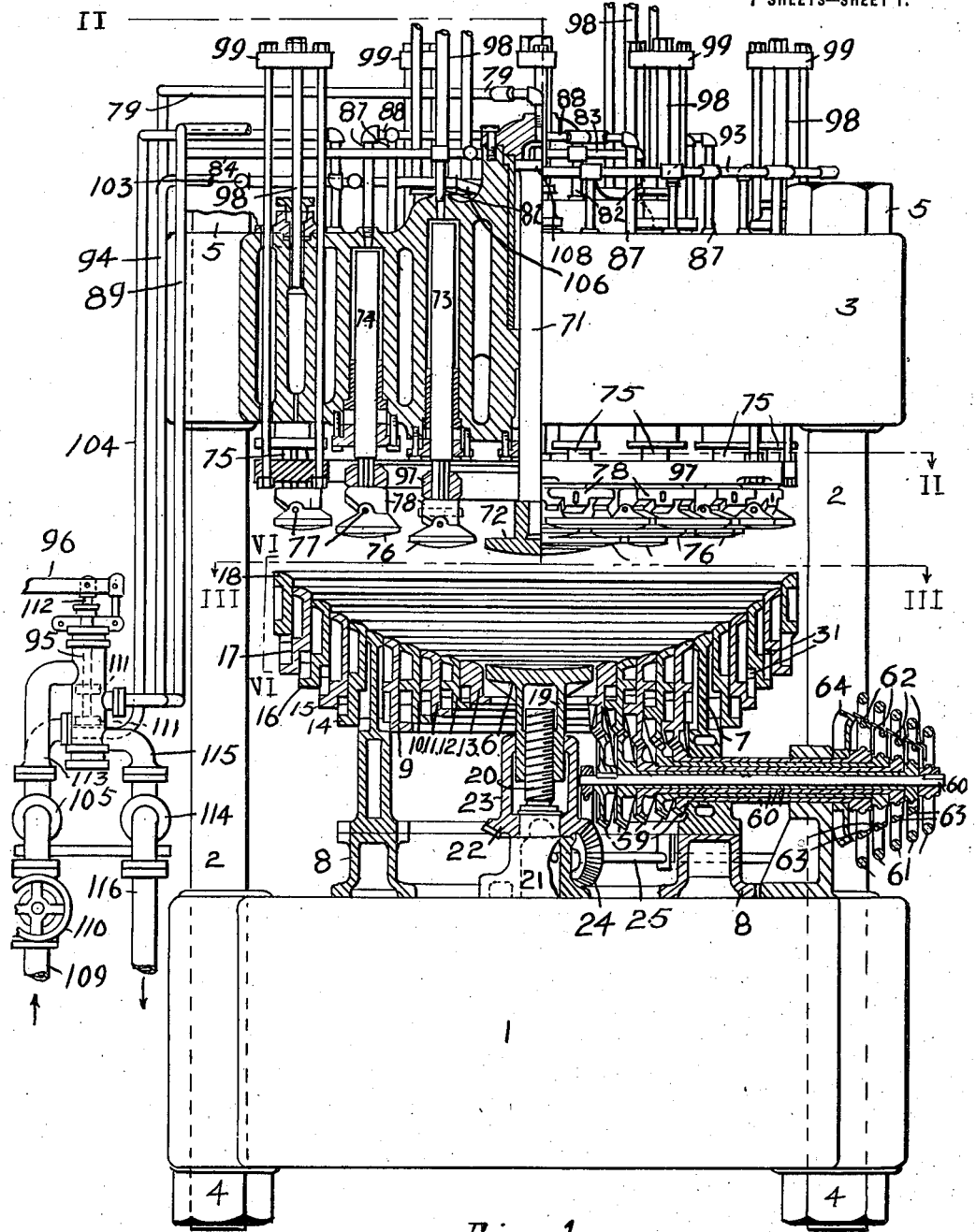

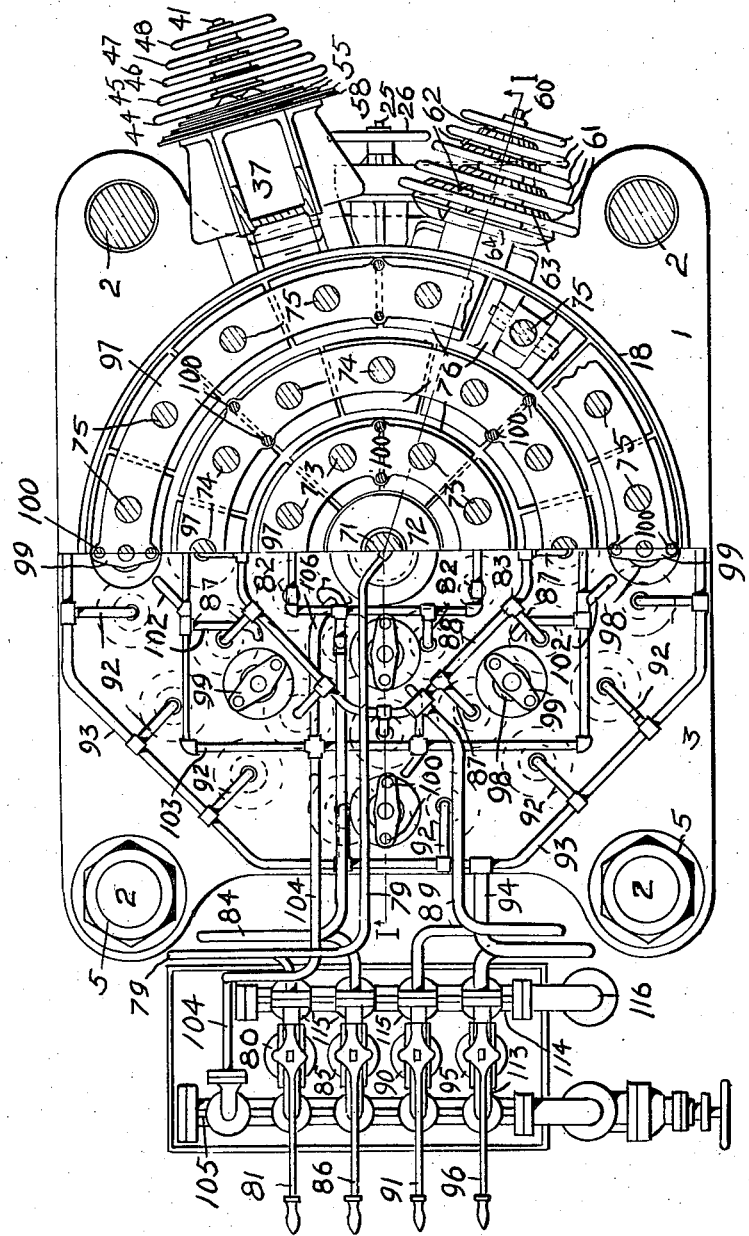

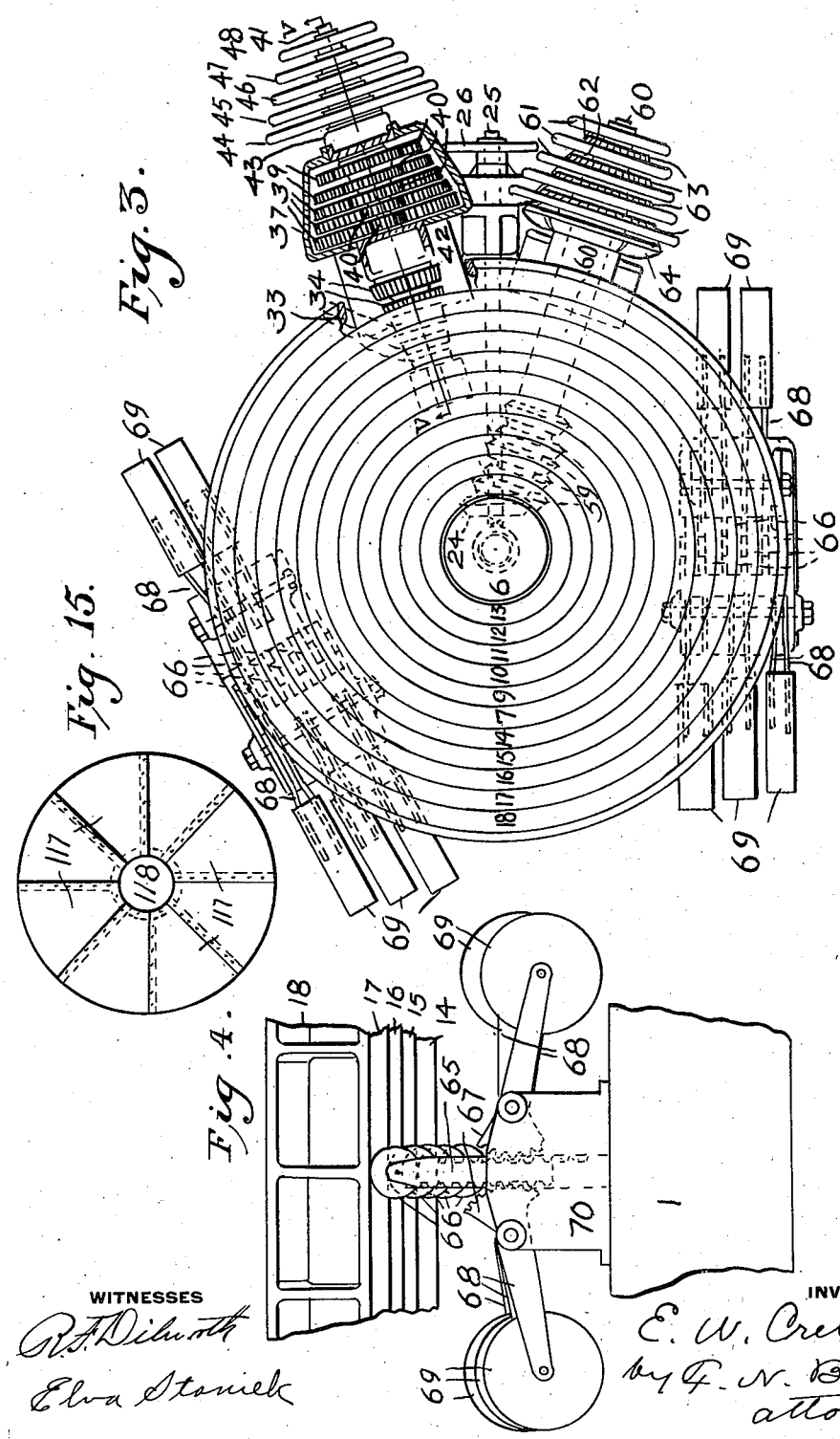

1,156,062.

Patented Oct. 12, 1915.
7 SHEETS—SHEET 4.

WITNESSES

INVENTOR

E. W. CRELLIN.
METAL BENDING MACHINE.
APPLICATION FILED NOV. 2, 1914.
1,156,062.
Patented Oct. 12, 1915.
7 SHEETS—SHEET 5.
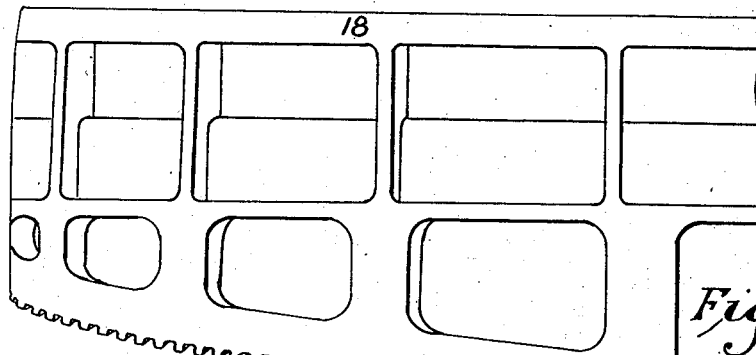
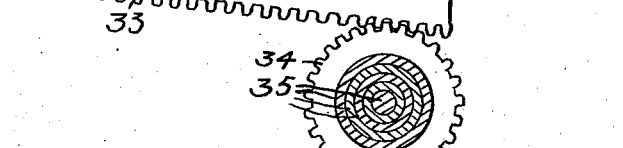
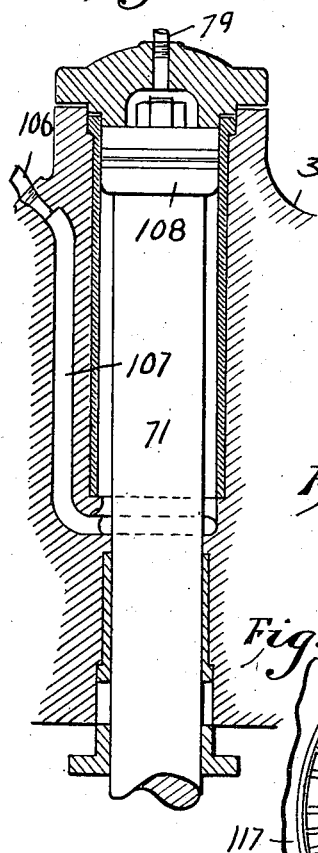
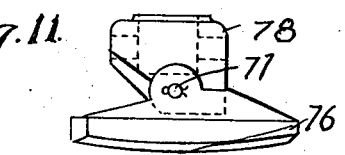
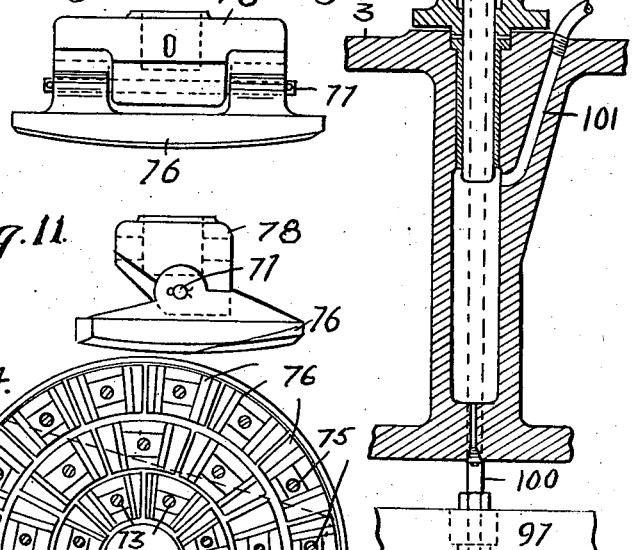
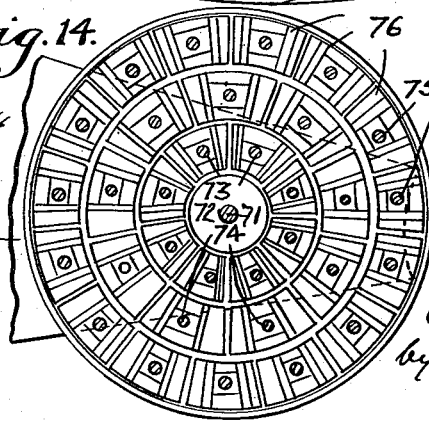

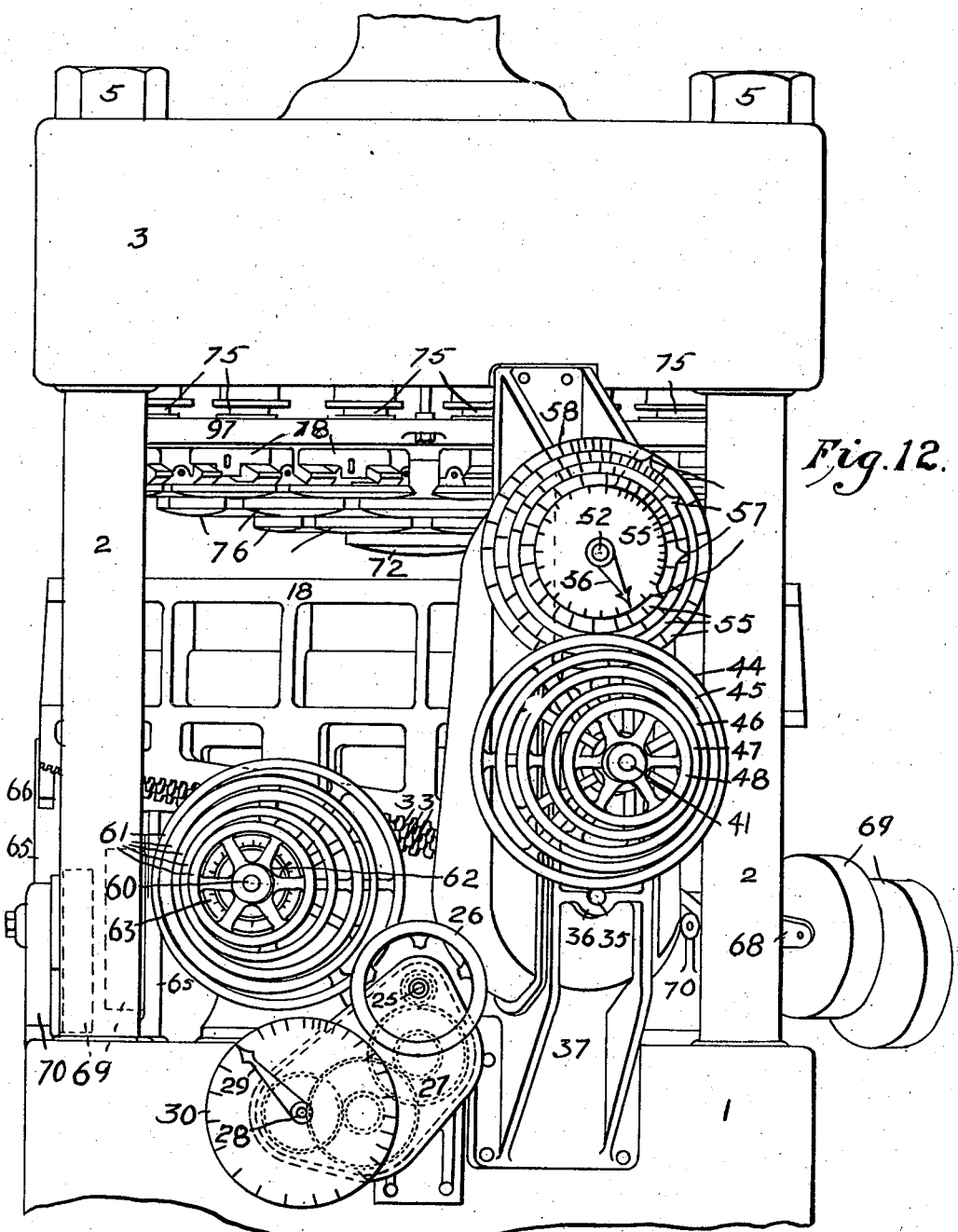

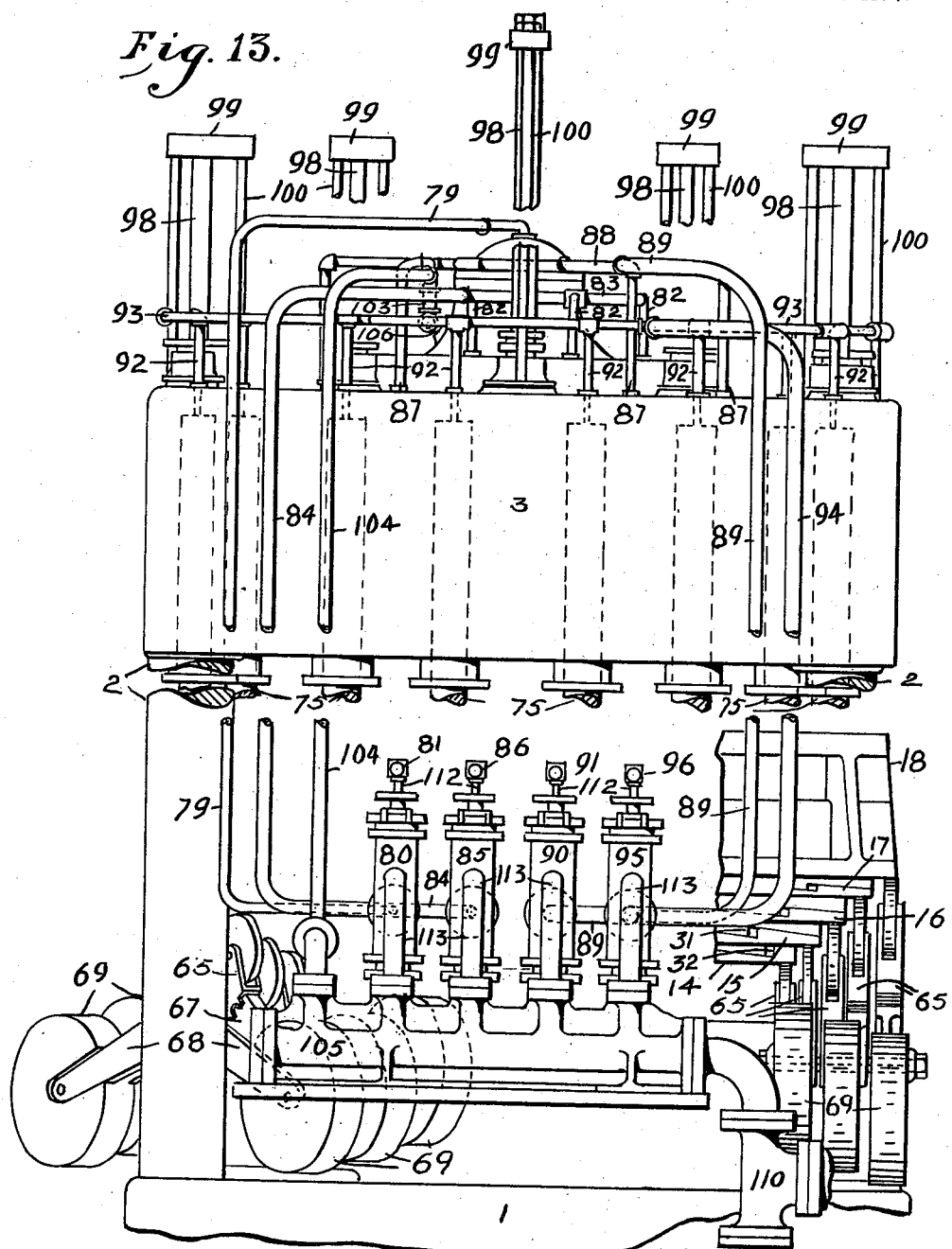

UNITED STATES PATENT OFFICE.

EDWARD W. CRELLIN, OF CRAFTON, PENNSYLVANIA, ASSIGNOR TO DES MOINES BRIDGE & IRON WORKS, OF DES MOINES, IOWA, A CORPORATION OF IOWA.

METAL-BENDING MACHINE.

1,156,062.  Specification of Letters Patent.  Patented Oct. 12, 1915.

Application filed November 2, 1914. Serial No. 869,759.

*To all whom it may concern:*

Be it known that I, EDWARD W. CRELLIN, a citizen of the United States, residing at Crafton, in the county of Allegheny and State of Pennsylvania, have invented new and useful Improvements in Metal-Bending Machines, of which the following is a specification.

My invention relates to apparatus for dishing metal plates and sheets.

Heretofore it has been very difficult to dish or concave plates required in the manufacture of the convex ends of metal tanks, such, for example, as are supported on towers and contain a supply of water for municipal or other purposes. The lower ends of such tanks, and in many instances the upper ends also, are segments of spheres, the segments being composed of a circular central section and a series of segmental plates riveted to the central section and to one another, as will more clearly appear in connection with the description of Figure 15. Heretofore it has been found practically impossible by a unitary machine to satisfactorily dish plates having unsymmetrical or angular shapes, such, for example, as are possessed by the segmental plates which largely constitute the convex bottoms of the above described tanks. One of the difficulties in dishing plates with angular or unsymmetrical outlines is to prevent the edges from buckling, crimping, or folding transversely of the edges.

Another object is to provide a machine which can be adjusted to dish plates or sheets to a curvature of any desired radius within certain limits.

Another object is to provide a machine of the character described with visual indicating means by which the machine may be adjusted to form a selected curved surface having the desired radius, without the use of a templet.

Other objects are to provide improved means for balancing the various movable parts, and for causing them to perform their work and return to their initial positions.

Other minor objects will appear hereinafter.

Figure 5:
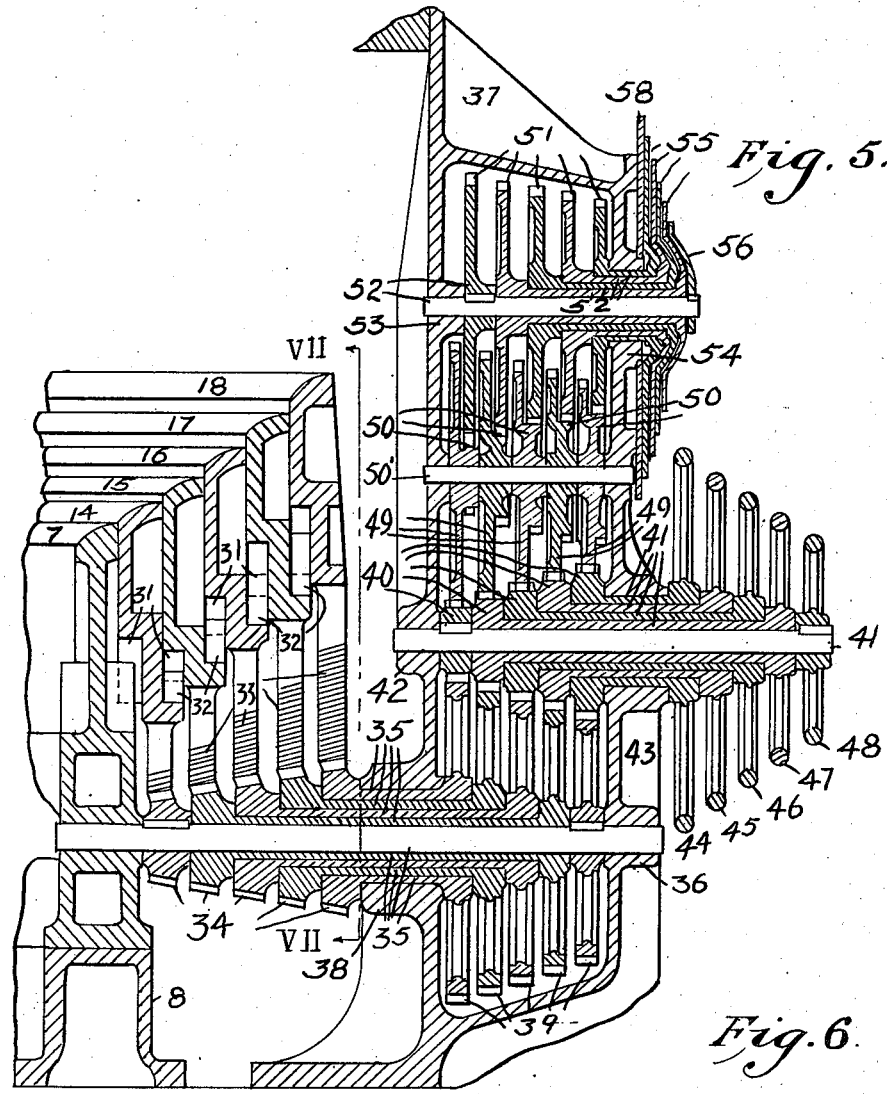
Figure 6:
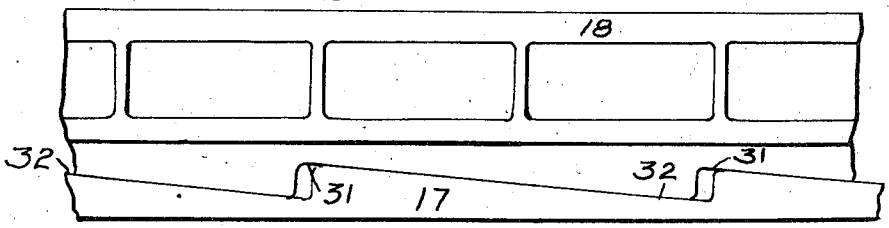

Referring to the accompanying drawings, Fig. 1 is partly a central vertical section, and partly an elevation of a machine embodying the principles of my invention the section being on the line I—I, Fig. 2 and parts being omitted; Fig. 2, a plan and a horizontal section on the line II—II, Fig. 1; Fig. 3, a horizontal section on the line III—III, Fig. 1, a portion being broken away; Fig. 4, an elevation of a portion showing the balancing means for the lower die; Fig. 5, a vertical section through one side of the outer ring-dies and the means for rotating them and indicating their rotary movements, the section being on the line V—V, Fig. 3; Fig. 6, an elevation of a portion of one die-ring and the means coöperating therewith for adjusting its levels, the view being taken from the line VI—VI, Fig. 1; Fig. 7, a fragmentary view showing a portion of one die ring in elevation and the means for rotating the same, a part being in vertical section, the view being taken on the line VII—VII, Fig. 5; Fig. 8, a vertical section through one of the power cylinders; Fig. 9, a vertical section through one of the cylinders for returning or raising the upper dies, parts being in elevation; Fig. 10, an elevation of one of the saddles or presser shoes and its holder; Fig. 11, an elevation of Fig. 10 rotated horizontally 90°; Fig. 12, an elevation of the machine; Fig. 13, an elevation of the machine looking at a different side, parts being broken away; Fig. 14, a view showing the lower dies and a few of the upper dies in relation to outlines of metal plates to be bent; and Fig. 15, a plan of a tank bottom showing the shape of the sections of which it is made and their arrangement.

On the drawings, 1 represents the base of my machine. It is generally rectangular in shape and has secured thereto near its corners the vertical parts 2 which support at their upper ends the head 3 substantially parallel with the base 1 and which contains various hydraulic mechanism to be described presently. The parts 2 are provided with the nuts 4 which engage the bottom of the base 1 and with the nuts 5 which engage the top of the head 3, the nuts preventing the relative movement of the base and head, one away from the other.

The lower die is composed of a central circular section 6 and a series of annular or ring sections all concentric with the circular section 6 and one another, that is, the sections are successively inclusive. I have shown these sections having their upper surfaces arranged to form the concave member of the dies. One of the intermediate rings, marked 7, is non-adjustable and is supported on the circular support 8 seated on the base 1. Between the ring 7 and the circular section 6, there are a series of five concentric ring sections 9 to 13, and beyond the ring 7 there is a second series of concentric ring sections 14 to 18. These two series of ring sections and the central section are adjustable vertically in order that the lower die may bend plates and sheets conforming to curvatures having radii of different lengths, without the necessity of providing separate machines for different curvatures. In order to make the lower die have curvatures with a shorter radius, it is necessary to raise the rings 14 to 18 and to lower the rings 9 to 13 and the central section 6. In order that the curvature of the lower die may be described by a longer radius the outer rings must be lowered and the inner rings and the section 6 must be raised.

The central die-section 6 has a depending tubular member 19 working as a nut on the vertical fixed screw 20 supported by the bearing 21 on which the horizontal bevel gear 22 may rotate. This gear has an upward extension 23 in which the member 19 is slidable and by which it is rotated. The bevel gear 22 meshes with the bevel gear 24 on the horizontal shaft 25 which has bearings on the support 8 and the post 21 and is rotated by the hand-wheel 26. The shaft 25 is connected by a train of gearing 27 to the shaft 28 which carries the pointer or hand 29 before the dial 30 containing suitable indications which may indicate radii of different lengths, the gearing being so proportioned that when the pointer 29 stands opposite any indication on the dial, the operator knows that the section 6 is properly set or adjusted for curving a plate to the radius signified by that indication.

The ring 9 is supported by the ring 7, and each of the rings within the ring 9 is supported by its inclosing ring, in the same manner, which is particularly shown on Figs. 6 and 13 and is indicated in a general manner in Figs. 1 and 5. The ring 7 also supports the ring 14, and each of the rings beyond the ring 14 is supported by its inclosed ring, in the same manner that the rings 9 to 13 are supported. A portion of the under edge of each of the rings 9 to 13 and 14 to 18 and of the opposite sides of the ring 7 is provided with a series of inclined steps 31 with the inclines all extending in the same direction around each ring. The steps 31 rest upon correspondingly-shaped inclined steps 32, that is, the inclines of the two series of steps incline upwardly in the same direction. It is now seen that if the rings 9 to 13 and 14 to 18 be rotated in the proper directions and through the proper distances, they will all have their levels changed. The means for rotating these rings and the indicating mechanism therefor will now be described.

The outer series of rings 14 to 18 have for a short distance on their lower edges segmental gears 33 arranged on the surfaces inclined parallel with the inclines on the steps 31 and 32 as may be seen by comparing Figs. 12 and 13. The separate segmental gears 33 mesh with separate pinions 34 secured to the inner ends of concentric individual driving shafts 35. The inner end of the innermost shaft 35 has its bearing in the ring 7 (Fig. 5), its outer end having its bearing in the outer wall of the housing 37. The outermost shaft 35 has its bearing 38 in the inner wall of the said housing. The shafts 35 are provided with individual spur-gears 39, meshing with spur-gears 40 secured to the concentric shafts 41, the innermost shaft having its bearing 42 on the inner wall of the housing 37 and the outermost shaft having its bearing 43 in the outer wall of the said housing. The shafts 41 are provided with individual hand-wheels 44 to 48. It is seen that, by turning the wheels 44 to 48, the respective rings 14 to 18 will be rotated and thereby raised or lowered.

The gears 40 mesh with the separate gears 49 mounted on the shaft 50' having bearings in the housing 37. The hubs of the gears 49 bear integral pinions 50 which mesh with the gears 51 mounted on the concentric shafts 52, the innermost shaft having its bearings 53 on the inner wall of the housing and the outermost shaft having its bearing 54 on the outer wall thereof. The shafts 52 except the innermost one carry each a dial 55 having indications or marks thereon, the innermost shaft carrying the pointer 56 which traverses the face of the outermost dial. Each of the dials bears a pointer 57 on its periphery, each pointer except the innermost traversing the face of the next inner dial, while the innermost pointer traverses the fixed dial 58. The several dials have thereon suitable marks corresponding to the several radii of the curvatures to which it is desirable that the lower die be adjusted, so that when the pointers all indicate a certain radius, the die rings 14 to 18 will be at the proper heights to form a plate with a curvature having the indicated radius.

The inner die-rings 9 to 13 are rotated by the gears 59 carried by the concentric shafts 60 and meshing with segments on the lower edges of the said rings, the segments and gears being similar to the segments 33 and the gears 34 already described. The shafts 60 carrying individual hand-wheels 61, each carrying a pointer 62 all of which except the innermost having travel over the dial 63 on the next inner wheel, the innermost pointer traveling over the fixed dial 64. The pointers and dials have the same functions with respect to the rings 9 to 13 that the pointers 56 and 57 and the dials 55 and 58 have with respect to the rings 14 to 18. If desired the dials and other elements of the indicating devices for the two series of rings may be omitted, and the rings may be rotated or adjusted in various other ways than shown.

The outer series of rings 14 to 18 are partially supported or counterbalanced by the vertically reciprocating bars 65 carrying at their upper ends the anti-friction rollers 66 in rolling contact with the bottom of the rings. The bars each have teeth along one edge, the teeth on each bar being in mesh with a separate segmental gear 67 carried on one end of separate weighted levers 68, each lever being pivoted between its segmental gear 67 and its weight 69. I provide two sets of these counter-balancing devices, each about 120° from the gears 34. As the rings are adjusted up and down, the counterbalancing devices follow and support the rings. The levers 68 are supported by bearings in the castings 70 resting on the base 1. These counterbalancing devices relieve the rings from considerable friction on their supports and make the adjustment of the rings much easier.

The head 3 contains the central hydraulic plunger or piston 71 carrying on its lower end the circular die-section 72 of the same diameter as the die-section 6, its bottom face being convexed to correspond with the concavity in the upper face of the die-section 6. The head 3 also contains three circular concentric series of plungers which are also concentric with the plunger 71. The plungers of the inner series are marked 73; those of the intermediate series are marked 74; and those of the outer series are marked 75. Each of the plungers 73, 74, and 75 carries at its lower end a tilting saddle or die 76 mounted on a pin 77 in a collar 78 secured to the plunger. Each collar is cut away on its outer lower corner to permit the saddle or die 76 to swing so that its bottom convex face may become parallel with that portion of the lower die beneath it.

Water is admitted to the upper end of the plunger 71 through the pipe 79, which is supplied with water through the valve or controller 80, operated by the lever 81. Controllers are old and the internal structure is, therefore, not illustrated, the drawing merely showing the presence of a controller. Water is admitted to the upper ends of the plungers 73 through the branch pipes 82 connected to the pipe 83 which is supplied with water by the pipe 84 leading to the controller 85 operated by the lever 86. Water is admitted to the upper ends of the plungers 74 through the branch pipes 87 connected to the pipe 88 which derives its supply of water through the pipe 89 which leads to the controller 90 operated by the lever 91. Water is supplied to the upper ends of the plungers 75 through the branch pipes 92 connected to the pipe 93 which derives its supply of water from the pipe 94 leading to the controller 95 operated by the lever 96.

It will be noticed that each circular series of plungers is provided with a ring 97 through which the lower ends of the plungers extend, the rings being above the collars 78. The head 3 is provided with three circular series of hydraulic plungers 98, there being one series of plungers 98 in the same circle with each series of plungers 73, 74, and 75. The plungers 98 carry on their upper ends above the head 3 cross-heads 99, from each of which two side bars 100 depend, the lower ends of the side bars for each series of plungers being connected to the ring 97 beneath.

Fig. 9 shows that the water is brought to the lower end of a plunger 98 by means of a passage 101 in the head 3. Water is supplied to the several plungers 98 by the branch pipes 102, connected to the pipe 103 which derives its water from the pipe 104 leading to the supply main 105. A branch pipe 106 leads from the pipe 103 to the passage 107 in the head, this passage opening beneath the piston head 108 on the upper end of the plunger 75 (Fig. 8). The water supply main 105 is connected to the supply pipe 109 leading to any suitable head or pressure supply of water, 110 being a hand valve in the pipe for cutting off the supply when it is desired to do so.

Each of the controllers has, for example, a piston valve 111 connected to its piston rod 112, which is connected to its operating lever. I have illustrated the valve construction for the controller 95 (Fig. 1), it being understood the other controllers contain the same elements and have the same connections. The supply main 105 is connected by the separate pipe 113 to the controllers (which are hollow cylinders) above the valve 111 and near the top thereof. The lower portion of each controller cylinder is connected below its valve 111 to the exhaust main 114 by the pipes 115. The exhaust main is drained by the waste pipe 116. The several pipes 79, 84, 89 and 94 enter their respective controller cylinders 80, 85, 90, and 95 between inlet pipes 113 and the outlet pipes 115. When the levers 81, 86, 91, and 96 are pushed down to their lower limit, the piston valve 111 stands between the outlet pipes 115 and the supply pipes 79, 84, 89, and 94, as shown by the lower dotted lines on Fig. 1, but when the levers are raised, the piston valves are stopped between the said supply pipes and inlet pipes 113. It is seen that, as long as the valve 110 is open, the water pressure has access to the lower ends of the plungers 98 and to the lower side of the piston 108, no matter whether the power pistons are supplied with water pressure on their upper ends or not. The total cross-area of the plungers 98 is small compared with the total cross-area of the power plungers, and the area of the top of the plunger 71 is smaller than the area of the annular portion thereof at the bottom of the piston 108, so that the pressure tending to raise the plungers is far less than the pressure exerted to lower them. The constant pressure tending to raise the plungers raises them when the operating levers are raised to exhaust the power cylinders in which the plungers 71, 73, 74, and 75 work.

On Fig. 15, I have shown in plan a view of a bottom for a water tank, composed of the central circular section 118 to which are riveted a circular series of segmental sections 117, the edges of the successive plates being riveted together. The sections 118 and 117 are bent by my machine to curvatures having the same radius before the sections are assembled. It will be observed that the sections 117 are wedge-shaped, their ends being arcs of concentric circles.

On Fig. 14, I have shown in dotted lines one of the segmental sections 117 on an enlarged scale, the section being supposed to rest on the lower die beneath the dies 72 and 76. I have shown the section 117 extending beyond the edge of the lower die. It will be observed that some of the upper dies press the lateral edges of the section 117 and others the intermediate portions. After the section 117 has been placed between the upper and lower dies, the lever 96 is moved so as to bring the piston valve below the supply pipe 94, whereupon water is admitted to the plungers 75, causing the outer circle of saddles or dies 76 to descend and those in line with the section 117 to engage the same. As the section 117 is narrower than the diameter of the lower die, the section will be pressed upon the lower die at one end and at a portion diametrically opposite. Soon after operating the lever 96, the lever 91 is operated so as to admit water to the plungers 74 which causes the middle circle of dies or saddles 76 to descend upon the section 117. Then the levers 86 are operated so as to admit water to the innermost circle of plungers 73 which causes the inner circle of dies or saddles 76 to descend upon the section 117. Then the lever 81 is operated so as to admit water to the top of the plunger 71 which causes the die 72 to descend upon the section 117. The operating levers may be actuated in quite close succession, and when the sections are circular, the levers may all be actuated at once.

When the upper dies are composed of three separate solid rings instead of separate saddles 76, I found that the lateral edges of the segmental sections 117 were badly wrinkled between the portions gripped by the outer ring. It appeared that the intermediate rings engaged the sections 117 on areas between the lateral edges thereof before engaging the said edges, the result being that the metal in the sections flowed somewhat toward those edges where it buckled or wrinkled before the pressure of the dies was exerted thereon. By my invention all the saddles of the outer ring go down together, but those engaging the edges of the sections 117, having less work to perform than those saddles engaging the intermediate portions of the sections, will descend faster and keep the edges tightly stretched. When the second circle of saddles engages the sections 117, those working on the edges go down faster than the others and keep the edges straight and bring them into contact with the lower dies before the intermediate portions of the sections reach the dies. The saddles not only keep the edges of the sections or blanks straight but they act as hold-downs for the edges while the dies acting between the edges stretch the metal as they press it down upon the lower die. After the dies have pressed one end of the section or blank 117 to the curvature of the lower die, it is pushed so that the uncurved portion lies between the upper and lower dies, whereupon this portion is dished by causing the machine to operate in the manner just described. In order to cause the upper dies to rise it is only necessary to lift the operating levers to bring all the piston valves to the upper dotted positions shown on Fig. 1, whereupon the power cylinders discharge their water through the pipe 116, as hereinbefore described, the plungers 71 and 98 causing the plungers 71, 73, 74, and 75 to expel the water from their cylinders and drive it to the waste pipe 116.

It will be seen that the rings 97 prevent the plungers from bending or the saddles 76 thereon from spreading when the saddles are coöperating with the lower dies, and that the plungers have some movement through the rings 97 so that one saddle may, when free to do so, move down farther or faster than another.

Though I have shown the section or blank 117 placed in a definite position between the dies, it is obvious that it may occupy other positions therein, since the surface of the lower die is described by the same radius swung from a single point. As the upper surface of the lower die is a portion of the surface of a sphere, it is not absolutely necessary that the blanks shall occupy definite positions.

Many changes may be made in my invention in both the details and the combinations thereof which come within the spirit of my invention as defined by the appended claims. I desire to include such changes within the scope of this invention.

I claim:

1. In a metal bending machine, a die containing a plurality of successively inclusive sections, having relative movement along their common axial center, and means for holding the sections in any one of a plurality of predetermined relative arrangements thereof along the said axial center.

2. In a metal bending machine, a die containing a plurality of successively inclusive sections, and means for holding the sections at any one of various relative adjustments along their common axial center.

3. In a metal bending machine, a die comprising a plurality of successively inclusive sections, and means for adjusting the relative positions of the sections along their common axial center whereby the bending surfaces of the sections may have any one of several shapes.

4. In a metal bending machine, a die member comprising a plurality of successively inclusive sections, one of the intermediate sections being stationary, and means for holding the remaining sections at any one of various adjustments along their common axial center.

5. In a metal bending machine, a die comprising a plurality of successively inclusive sections, one of the intermediate sections being stationary, and means for adjusting the remaining sections along their common axial center.

6. In a metal bending machine, a die comprising a plurality of successively inclusive sections, and means whereby the sections may be rotated on their common axial center and thereby adjusted along the said center.

7. In a metal bending machine, a die comprising a plurality of concentric sections, and means whereby the sections may be rotated on their common axial center and inclines between consecutive sections whereby the rotation of one section moves it along the said center.

8. In a metal bending machine, a die comprising a plurality of concentric sections, one of the intermediate sections being stationary and the others being rotatable, means on each section for supporting an adjacent section, and means whereby the rotation of a rotatable section adjusts itself and the section supported thereby along their common axial center.

9. In a metal bending machine, a die comprising a plurality of concentric sections, means whereby the rotation of the sections changes their levels, a pinion for rotating each section, and a toothed rack for each section meshing with one of the pinions, the line of the teeth on the racks being inclined so as to keep the racks and pinions in mesh as the sections are rotated and raised or lowered.

10. In a metal bending machine, a die comprising a circular central section, a plurality of successively inclusive annular sections concentric therewith, means for adjusting the central section axially to different fixed positions, and means for adjusting the annular sections axially to different fixed positions.

11. In a metal bending machine, a die comprising a plurality of successively inclusive sections having movement relative to one another along their common axial center, means whereby the sections of the said die are held relatively fixed along their said axial center to present any one of several shaping surfaces of different cross section, and a second die coöperative with the first die to press a metal plate or sheet between them to the shaping surface of the first die.

12. In a metal bending machine, a die comprising a plurality of successively inclusive sections having movement relative to one another along their common axial center, means whereby the sections of the said die are held relatively fixed along their said axial center to present any one of several shaping surfaces of different cross section, and a second die having movable sections coöperative with the first die to press a metal plate or sheet between them to the shaping surface of the first die.

13. In a metal bending machine, a die comprising a plurality of successively inclusive annular sections, having relative movement along their common axial center, means whereby the sections are held relatively fixed along their said axial center, and a second die coöperative with the first die to press a metal plate or sheet between them to the shaping surface of the first die, the second die containing shaping annular sections, comprising segments independently movable with respect to one another.

14. In a metal bending machine, a die comprising a plurality of successively inclusive sections, means for adjusting the relative positions of the sections along their common axial center to present any one of several different shaping surfaces, and devices movable with the sections and indicating the relative positions of the same.

15. In a bending machine, a die comprising a plurality of successively inclusive sections, means whereby the sections may be rotated on their common axial center and thereby adjusted along the said center, and devices movable with the sections and indicating the relative positions of the said sections.

16. In a bending machine, a die having its working face curved transversely in all directions through a common center, an opposing die coöperative with the first named die and comprising concentric series of die-sections, and means for moving each series toward the first named die.

17. In a bending machine, a die having its working face curved transversely in all directions through a common center, an opposing die coöperative with the first named die and comprising concentric series of die-sections, means for moving each series toward the first named die, and means whereby the die-sections in each series may move independently of one another.

18. In a metal bending machine, a die comprising a plurality of concentric sections, means for adjusting the relative positions of the sections along their common axial center, and a die coöperative with the first die, the second die having tilting faces whereby it may conform substantially to the working face of the first die at all the curvatures to which the latter may be adjusted.

19. In a bending machine, a die having its working face curved transversely in all directions through a common center, a die coöperative with the first named die and comprising concentric series of die-sections, means for moving each series toward the first named die, and means for automatically returning the die-sections to their initial position when the said moving means is released.

20. In a bending machine, a die having its working face curved transversely in all directions through a common center, a die coöperative with the first named die and comprising concentric series of die-sections, means for moving each series toward the first named die, means for automatically returning the die-sections to their initial position when the said moving means is released, and for preventing the die sections from moving laterally.

21. In a bending machine, a die having its working face curved transversely in all directions through a common center, a die coöperative with the first named die and comprising concentric series of die-sections, means for moving each series toward the first named die, and means for preventing the die sections from moving laterally.

22. In a bending machine, a plurality of annular series of fluid-operated power plungers, means for separately operating each series, a ring for each series to which the plungers of the respective series are connected, a series of fluid-operated die-returning plungers for moving the rings and power plungers to their initial positions after they have been moved to their working positions, and means whereby the die-returning plungers are automatically operated when the motor fluid which has operated the power plunger is exhausted, bending dies carried by the power plungers, and a die coöperative with the bending dies.

23. In a bending machine, a die having its shaping face comprising the ends of a plurality of successively inclusive sections having relative parallel movement, and means for holding the sections at a predetermined one of several arrangements thereof.

24. In a metal bending machine, a die containing a plurality of successively inclusive sections, having relative movement along a common line, and means for holding the sections in a predetermined one of several relative arrangements thereof along the said common line.

25. In a metal bending machine, a die comprising a plurality of successively inclusive sections having movement relative to one another along their common axial center, means whereby the sections of the said die are held relatively fixed along their said axial center, and a second die coöperative with the first die to press a metal plate or sheet between them to the shaping surface of the first die, the second die comprising independent concentric sections.

Signed at Pittsburgh, Pa., this 31st day of October, 1914.

EDWARD W. CRELLIN.

Witnesses:
ALICE E. DUFF,
ELVA STANDICH.